UNITED STATES PATENT OFFICE.

ALFONS GAMS, OF BASEL, SWITZERLAND, ASSIGNOR TO SOCIETY OF CHEMICAL INDUSTRY IN BASLE, OF BASEL, SWITZERLAND.

PRODUCT DERIVED FROM OPIUM AND PROCESS OF MAKING SAME.

1,243,729.  Specification of Letters Patent.  Patented Oct. 23, 1917.

No Drawing.  Application filed March 24, 1917. Serial No. 157,215.

*To all whom it may concern:*

Be it known that I, ALFONS GAMS, chemist, a citizen of the Swiss Republic, and resident of Basel, Switzerland, have invented a new Product Derived from Opium and Process of Making Same, of which the following is a full, clear, and exact specification.

Attempts have already been made to prepare with opium a product soluble in water, suitable for injections and possessing the whole unaltered action of the opium. As is known, neither the opium tincture, nor the opium extract which dissolves to a turbid solution, possess these properties, the said opium extract containing by the by only a part of the therapeutically valuable alkaloids "narcotin, papaverin and thebain".

By extracting opium with dilute mineral acids, the natural forms of combination of its active substances are destroyed, that is to say the meconates, etc., are decomposed to corresponding salts of the mineral acids and meconic acid and the like are split off. By extracting opium with non volatile organic acids, as for instance tartaric acid, it is necessary to employ an excess of the acid for obtaining a complete extraction; but owing to this want of volatility the said excess of organic acid cannot be removed subsequently, without destroying simultaneously the natural forms of combination of the opium alkaloids. By extracting opium with certain volatile organic acids, as for instance acetic acid, all the active constituents namely the narcotin and the papaverin are not transformed into stable salts, so that the products prepared with aid of acetic acid contain only a part of the said valuable alkaloids.

I have now found, that a product derived from opium which dissolves in water to a clear solution, is suitable for injections and contains all the opium alkaloids in their natural forms of combination and in their natural proportions, can be obtained by extracting from the opium with water its active constituents constituted by salts soluble in water, as for instance the meconates, without destroying their natural forms of combination, and by treating the residue remaining after this extraction, which contains a number of further valuable constituents, as narcotin, papaverin and thebain, in form of bases, with dilute alcohol to which have been added small quantities of formic acid, that is to say of an organic acid, forming stable salts with the said alkaloids, so that these latter are thus dissolved as formates. The alcohol and the excess of the employed volatile organic acid (formic acid), are then removed from the dilute alcoholic solution thus obtained by distillation in a vacuum and the solution is separated by filtration from the remaining inactive substances. There is thus obtained an aqueous solution of the formates of the specified alkaloids, which is added to the aqueous extract first obtained and the mixture is diluted with water to a multiple of its volume, whereby the mucilaginous substances and other inactive substances are precipitated. By evaporating the filtered solution in a vacuum there is directly obtained a product which contains all the alkaloids in a form soluble in water, some in their natural forms of combination and the rest in the form of organic acid salts in the same natural quantitative proportions, as they are contained in the natural drug, and which can be employed directly for injection purposes. In order to eliminate the last remnants of albuminous substances from the obtained solution this latter can be treated, if desired, with lead salts, before evaporating, whereby the albuminous substances are precipitated, and after these latter have been separated by filtration the remaining liquid is freed from lead by hydrogen sulfid and evaporated in a vacuum, giving thus a product free of albuminous substances.

The invention is illustrated by the following example:

Example: 200 gr. of comminuted opium are extracted twice in succession with cold water, using 800 ccm. for each extraction, the two extracts are poured together. The remaining residue is extracted with a liter of cold alcohol of 80 per cent. strength, to which 1 ccm. of concentrated formic acid has been added. Two solutions, an aqueous one and a slightly formic dilute alcoholic one, are thus obtained. The latter is freed from alcohol by distillation in a vacuum and if hereafter the solution contains still some formic acid, this latter is eliminated from the solution by adding water and a further distillation. After the separated resinous and fatty constituents have been eliminated by convenient filtration, the clear aqueous solution thus obtained is added to the first aqueous extract which has in the meantime been evaporated in a vacuum to a small volume, and the whole solution diluted with distilled water to a multiple of its volume, whereby mucilaginous substances are precipitated which can be separated by filtering. The remaining clear solution is evaporated to dryness in a vacuum, whereby the new product derived from opium is obtained in the form of a light yellow-brown powder (116 to 120 gr.). It dissolves in water to a light brown-yellow solution. Its aqueous solution gives with Mayer's reagent a voluminous precipitate, with phospho-tungstic acid a voluminous beige-colored precipitate, with picric acid a canary-yellow precipitate and with sodium acetate a voluminous precipitate (papaverin and narcotin). By adding a mineral acid to the aqueous solution and allowing the mixture to stand for a certain time, the mixture becomes gradually red, quicker when heated.

If the aqueous solution be shaken with acetic ether, the separated layer of acetic ether be floated on a little water and a drop of a dilute of ferric chlorid solution be added, no red zone is formed even after a long standing, showing the absence of free meconic acid. The same is the case when the aqueous solution is previously boiled for a short time. But if a drop of a dilute mineral acid is added to the aqueous solution, the application of the test described above produces a deep-red zone showing that the meconic acid has been liberated by the added mineral acid.

If a further purification of the product obtained by the above specified process is desired, a dilute aqueous solution of lead salt, as for instance of lead formate, is added to the dilute aqueous solution, containing a little quantity of formic acid, obtained according to the above described process, after separation of the mucilaginous substances; after filtration the lead is removed from the filtered solution by means of hydrogen sulfid and finally the solution evaporated to dryness. In this manner it becomes possible to remove the last traces of albuminous substance which may have been dissolved in the solution.

What I claim is:

1. The herein described process for the manufacture of a product derived from opium, soluble in water, suitable for injections and containing all the alkaloids in their natural forms of combination and in their natural proportions, consisting in extracting first the opium with water, extracting afterward the remaining residue with dilute alcohol to which has been added formic acid, which forms stable salts with narcotin, papaverin and thebain, freeing the solution obtained by this second extraction from alcohol and from volatile formic acid in excess and removing therefrom the separated inactive substances, adding this latter solution to the solution which has been obtained by the aqueous extraction, diluting the resulting mixture with water to a multiple of its volume, in order to precipitate the mucilaginous substances, and evaporating, after filtration, the liquid to dryness in a vacuum.

2. The herein described process for the manufacture of a product derived from opium, soluble in water, suitable for injections and containing all the alkaloids in their natural forms of combination and in their natural proportions, consisting in extracting first the opium with water, extracting afterward the remaining residue with dilute alcohol to which has been added formic acid which forms stable salts with narcotin, papaverin and thebain, freeing the solution obtained by this second extraction from alcohol and from volatile formic acid in excess and removing therefrom the separated inactive substances, adding this latter solution to the solution which has been obtained by the aqueous extraction, diluting the resulting mixture with water to a multiple of its volume, in order to precipitate the mucilaginous substances, removing with a lead salt the albuminous substances which may still be dissolved in the liquid, freeing this latter from the lead and evaporating it, after filtration, to dryness in a vacuum.

3. As a new product, the herein described product derived from opium, soluble in water, suitable for injections and containing all the alkaloids of the opium in their natural forms of combination and in their natural proportions, constituting a light yellow powder, dissolving in water to light yellow-brown dissolutions, which gives with Mayer's reagent a voluminous precipitate, with phosphotungstic acid a voluminous beige colored precipitate, with picric acid a canary yellow precipitate and with sodium acetate a voluminous precipitate, and with mineral acid after standing for a long time a red coloration which may be obtained more quickly by heating.

In witness whereof I have hereunto signed my name this 28th day of February 1917, in the presence of two subscribing witnesses.

ALFONS GAMS.

Witnesses:
LYDIA UEBELE,
AMAND RITTER.